F. J. DORAN AND O. H. KIRCHNER.
AUTOMOBILE SIGNAL.
APPLICATION FILED OCT. 8, 1919.
1,348,097.  Patented July 27, 1920.
2 SHEETS—SHEET 1.
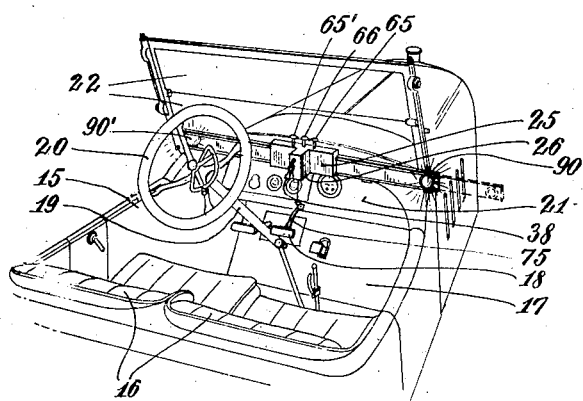
Fig. 1.
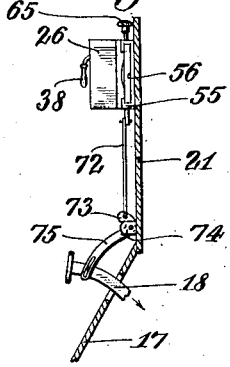
Fig. 7.
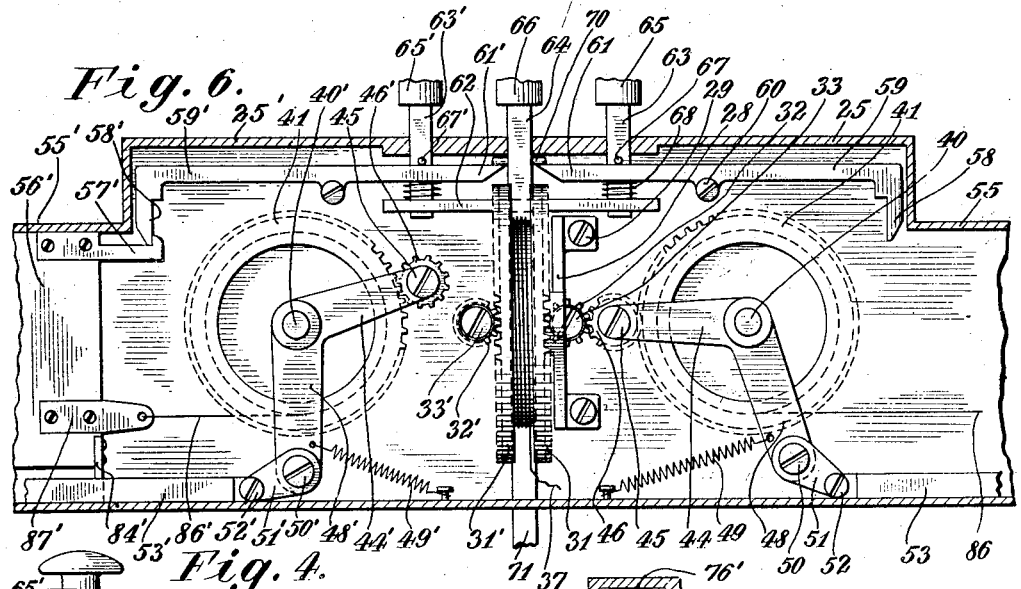
Fig. 6.
Fig. 4.
Fig. 5.
Inventors
Frank J. Doran
Otto H. Kirchner
By Alfred Joehnkel Attorney

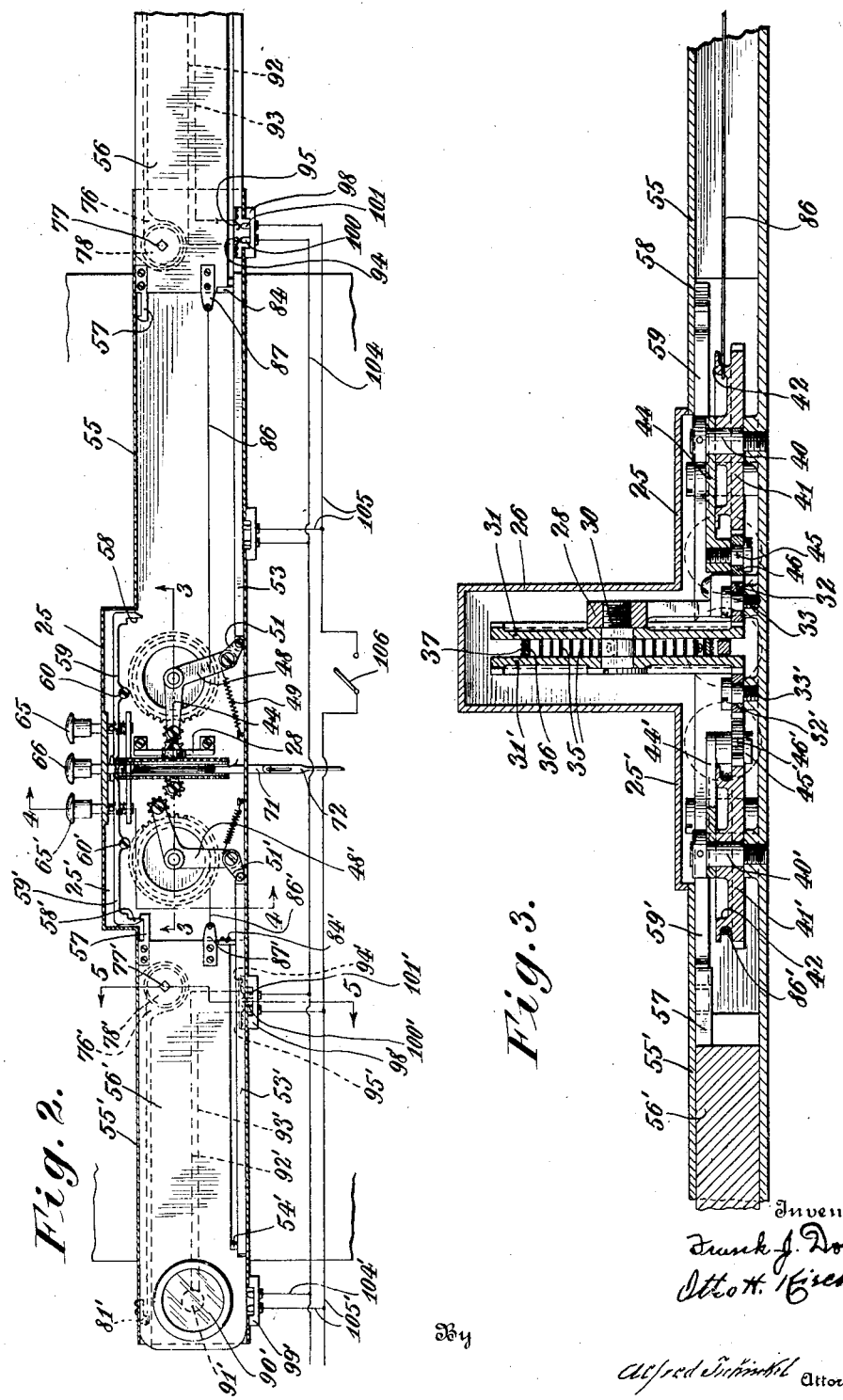

UNITED STATES PATENT OFFICE.

FRANK J. DORAN AND OTTO H. KIRCHNER, OF HOBOKEN, NEW JERSEY.

AUTOMOBILE-SIGNAL.

1,348,097.  Specification of Letters Patent.  Patented July 27, 1920.

Application filed October 8, 1919. Serial No. 329,404.

*To all whom it may concern:*

Be it known that we, FRANK J. DORAN and OTTO H. KIRCHNER, citizens of the United States, and residents of Hoboken, in the county of Hudson and State of New Jersey, have invented certain new and useful Improvements in Automobile - Signals, of which the following is a specification.

This invention has as its main object to provide an apparatus capable of indicating, to observers at the rear of a vehicle, the proposed turning direction or stopping of the same, the apparatus being readily attachable to ordinary manually directed vehicles of self propelled types without change therein.

A further object is to combine with the movable parts means for displaying a light so that an efficient visible signal may be given in the dark as well as in the light.

Another object is to provide means whereby upon the manual depression of certain conveniently located buttons, either or both of the signal arms are automatically extended, while the pull exerted on a signal knob returns them to their initial position, the entire apparatus being normally disposed in the vehicle, in front of the operator and occupying a minimum of space not otherwise used.

These and other like objects, which will become more fully apparent as the description progresses, are attained by the novel construction and combination of parts hereinafter described and shown in the accompanying drawings, forming a material part of this disclosure, and in which:—

Figure 1 is a perspective view showing a direction indicator made in accordance with the invention and illustrating its application.

Fig. 2 is a fragmentary front elevational view of the same, the casing cover being removed.

Fig. 3 is a horizontal sectional view, taken on line 3—3 of Fig. 2, drawn to an enlarged scale.

Fig. 4 is a further enlarged transverse sectional view, taken on line 4—4 of Fig. 2.

Fig. 5 is a similar sectional view, taken on line 5—5 of Fig. 2.

Fig. 6 is a front elevational view of the operating mechanism, and,

Fig. 7 is a vertical sectional view showing the foot control.

Referring to the drawings in detail, the numeral 15 designates in general a conventional type of automobile, having seats 16 and a foot board 17 on which are mounted the control elements including the brake lever 18.

The steering post 19 surmounted by the hand wheel 20 extends through the footboard, over which is the dash-board 21, surmounted by the wind shield 22, all of these several parts being of ordinary construction and not a part of the present invention.

Fixed centrally upon the upper part of the dash-board 21 is an oblong rectangular metal casing, its ends, respectively right and left, being designated 25 and 25', while centrally at the front is a hollow narrow extension 26 provided with a hinged cover plate 27.

A bracket 28 is secured to the rear wall of the casing by screws 29 and set in the bracket is a screw stud 30 on which are revolubly mounted a pair of opposed gears 31 and 31' having lateral peripheral teeth, engaged respectively with spur pinions 32 and 32' rotatably secured on shoulder screws 33 and 33' to the rear wall of the casing.

Fixed on the squared central portion of the stud 30 is the inner end of a spirally coiled flat spring 35, its several convolutions being free to move in the space between the backs of the gears 31 and 31' to which the outer end of the spring is attached.

A band 36 encircles the spring 35 and attached to the band is one end of a cord 37, its opposite end extending through an appropriate opening in the cover 27 where it is attached to a pull knob 38 convenient of access by an operator and provided with a cushion spring 39 to prevent shock and noise as the handle is released and drawn sharply against the cover by the action of the spring 35.

A pair of screw studs 40 and 40' are fixed in the rear wall of the casing and revoluble on them are spur gears 41 and 41' formed with integral grooved sheaves 42 and 42' on their upper surfaces.

Also pivotally mounted on the upper ends of the studs 40 and 40' are bell-crank levers having arms 44 and 44' carrying studs 45 and 45' on which are revolubly mounted pinions 46 and 46' engaged with the gears 41 and 41' and also engageable with the pinions 32 and 32' as will hereafter become apparent.

The other arms 48 and 48' of the bell-crank levers are normally drawn toward the center of the casing by tension springs 49 and 49' fixed at their respective ends to the lever arms and casing side walls, thus holding the pinions out of operative engagement.

Attached to the extreme outer ends of the lever arms 48 and 48' by pivot screws 50 and 50' are links 51 and 51', in turn pivoted on screws 52 and 52' to bars 53 and 53', in which, set in their extreme outer ends are laterally extending pins 54 and 54'.

Extending rigidly out from the ends 25 and 25' of the center casing are elongated guides 55 and 55', the same being partially open at the front and reaching to the sides or edges of the dash-board 21, to which they are attached.

Slidably engaged in these guides are bars 56 and 56', which are extensible beyond the ends of the guides under certain conditions but which are normally held in retracted position therein by hook catches 57 and 57' secured to their inner ends, these catches engaging with detents 58 and 58' formed on lever bars 59 and 59', pivoted on screws 60 and 60' set in the casing.

The inner ends 61 and 61' of the lever bars closely approach at the center of the casing and fixed therebelow, parallel with the wall of the casing, is a guide plate 62, through which the stems 63 and 63', and 64 of push buttons 65 and 65' and 66, freely pass, the stems being further guided by the top wall of the casing.

Fixed transversely in the stems 63 and 63' are pins 67 and 67', adapted to make contact with the lever bar ends 61 and 61' so that either may be depressed, thereby releasing the corresponding slides 56 and 56', these lever bar ends being held in a normally raised position due to the coiled compression springs 68 and 68' disposed between them and the fixed guide plate 62.

A pin 70, set in the stem 64 makes contact with the inner ends of the lever bars 61 and 61' simultaneously upon depression of the center push button 66 whenever both of the slides are to be released.

This result is also accomplished by a prolongation 71 of the stem 64 to which is attached a link 72 connecting with the bell-crank lever arm 73, the lever being fulcrumed in a bracket 74 attached to the lower part of the dash-board 21, its other arm 75 engaging with the pedally operated brake lever 18, as best shown in Fig. 7.

The slides 56 and 56', when freed of the detents and catches, are forced outward in the following manner. Formed in the slides are recesses 76 and 76' in which, journaled on fixed studs 77 and 77', are drums 78 and 78', annularly recessed and containing spirally coiled flat springs 79 and 79', one end of the springs being secured to the fixed studs and the other to the interior of the drums, which have wound upon them cords 80 and 80', these cords being secured at one end to the drums and extending in longitudinal recesses formed in the edges of the slides to clips 81 and 81' secured on the inner sides of the guides 55 and 55' near their outer ends.

Thus the tension of the springs 79 and 79' causes the drums to rotate, coiling the cords upon them and advancing the slides outwardly when free to move.

The ultimate outward movement of the slides brings stops 84 and 84', secured to their inner ends, into operative engagement with the pins 54 and 54' and through their connections turning the bell-crank lever arms 44 and 44' downward so as to engage the pinion couples 32 and 46 and 32' and 46' so that the same may be actuated by pulling the knob 38.

The slides 56 and 56' are retracted or drawn inwardly by cords 86 and 86' normally wound upon the sheaves 42 and 42', to which they are attached at one end, the other ends of the cords being fixed to clips 87 and 87' secured to the inner ends of the respective slides, so that as power is transmitted through the gears when enmeshed the slides are moved inwardly.

It may here be explained that the force of the springs 79, is greater than the springs 49, so that the bell-crank levers are moved upon contact of the stops 84 and pins 54 but returned to their initial positions when the winding operation of the sheaves has been performed.

Carried near the outer ends of the slides 56 and 56' are colored lenses 90 and 90' having behind them electric lamps 91 and 91' connected by lead wires 92—93 and 92'—93' with spring contacts 94—95 and 94'—95' fixed in the slides at their inner front edges, adjacent to the extension casings 55 and 55'.

Fixed upon the lower sides of these casings, are insulated brackets 98—99 and 98'—99', the inner pair carrying fixed contacts 100 and 101 engageable with the spring contacts 94 and 95, while the outer pair of brackets carry contacts 102 and 103 engageable with the same spring contacts when the slides are in an extended position, the fixed contacts 100, 101, 102 and 103 being connected by feed wires 104 and 105 leading from any convenient source of electrical energy and controlled by the circuit switch 106.

Thus when the slides are in either a fully retracted or extended position, and the switch closed, a signal light will show through the lenses.

In operation, let it be assumed, that it is the intention to turn the vehicle to the right, whereupon the buttons 65 will be depressed. This action releases the slide 56 which is instantly moved to its extreme outer position by the spring 79 causing the cord to be wound on the drum and when the slide is fully extended the pinions 32 and 46 are caused to mesh, the lights showing, if the switch 106 is closed.

Upon making the turn the knob or handle 38 is drawn outward, causing the gears 31 to rotate, which motion is conveyed to the gear drum 41, winding the cord 86 upon it and retracting the slide.

If it is desired to indicate an intention to stop the vehicle, the signal is given by extending both slides simultaneously either by depressing the center button 66 manually, or by operating the brake lever 18, which by reason of its connections accomplishes the same purpose.

If the vehicle be used in the dark, both lights are caused to show at all times except during the momentary interval of their travel, which, because of its brevity, is negligible.

The foregoing disclosure is to be regarded as descriptive and explanative rather than limitative of the invention, of which obviously minor modifications may be made within the scope of the appended claims.

It will be apparent that a neat appearing device for the purpose set forth has been disclosed and that the same is capable of efficient operation in an easy and convenient manner, and further, that the attachment can be readily applied to vehicles of presently existing constructions.

Having thus described our invention, what we claim as new, and desire to secure by Letters Patent, is:—

1. A direction indicator comprising a casing, guide arms extending oppositely therefrom, slides movable in said arms, spring actuated means for extending said slides, detents engageable with said slides when retracted, manually operable means for releasing said detents, geared drums rotatable in said casing, cords attached to said slides adapted to be wound on said drums, bell-crank levers pivoted on the axis of said drums, pinions carried by one of the arms of said bell-crank levers, manually operable gear trains engageable by said pinions, and means for shifting said pinions into mesh therewith said means becoming operative upon the full extension of said slides.

2. A direction indicator for vehicles, comprising a casing, a pair of opposed guides extending therefrom, bars slidable in said guides, means carried in said slides whereby they are normally projected outwardly, an interrupted gear train for each of said slides, means for enmeshing the elements of said gear trains by said slides when fully extended, manually operated means for actuating said gear trains, retracting connections between said gear trains and said slides, spring actuated detents for retaining said slides when retracted, means for releasing said slides individually, means for releasing both of said slides simultaneously and means engaged with the brake of the vehicle for actuating the last named release means.

Signed at Hoboken, in the county of Hudson and State of New Jersey, this the 16th day of September, A. D. 1919.

FRANK J. DORAN.
OTTO H. KIRCHNER.